Patented May 21, 1940

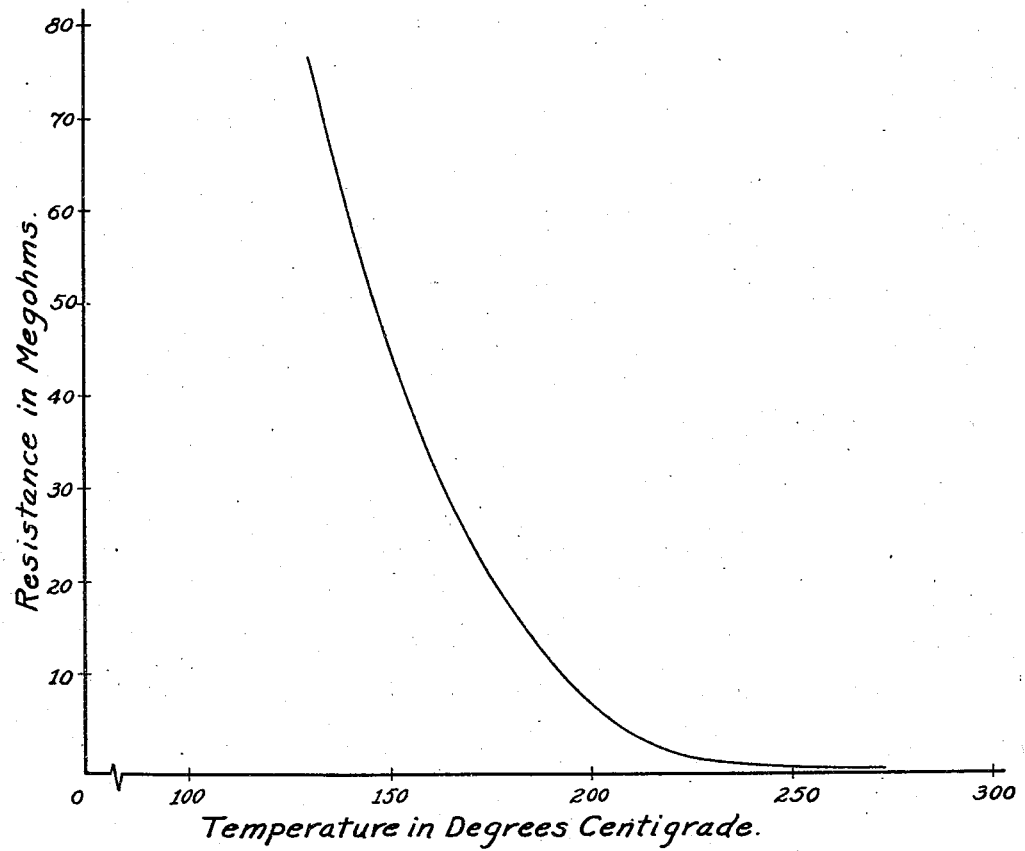

2,201,840

UNITED STATES PATENT OFFICE 2,201,840

METHOD OF TREATING ASBESTOS

Emerson Venable, Wilkinsburg, Pa., assignor to Westinghouse Electric & Manufacturing Company, East Pittsburgh, Pa., a corporation of Pennsylvania Application February 17, 1938, Serial No. 191,038

3 Claims. (Cl. 91—70)

This invention relates generally to the insulation of coils of electrical apparatus, and particularly to a method of improving the abrasion and insulating properties of asbestos.

Asbestos is sometimes employed as the insulating material or wrappings for the turns of coils of air-cooled transformers. Asbestos is satisfactory electrically for this purpose, but has the disadvantage that it is not resistant to abrasion when handled. It is therefore desirable to provide for making the asbestos resistant to abrasion while at the same time improving its insulating properties.

An object of this invention is to provide for treating asbestos to render it dense and impervious and improve its resulting properties.

Another object of this invention is to provide a method of treating the coils of electrical apparatus, the turns of which are wrapped in asbestos whereby a dense, impervious insulating material is obtained which is resistant to abrasion.

Other objects of this invention will become apparent from the following description and from reference to the accompanying drawing, the single figure of which is a curve which illustrates the change of resistance between turns at different temperatures of a coil which has been treated in accordance with this invention.

This invention may be applied to asbestos insulation either in the sheet form or as it is employed as the insulating wrappings of the turns of coils (not shown) such as are utilized in electrical apparatus. Where the asbestos which is to be treated comprises the insulation of the turns of coils, the entire coil may be subjected to the treatment without damage to the other components of the coil.

Since asbestos is relatively soft, in order to render it resistant to abrasion, such as may be encountered in handling the coil during assembly of the electrical apparatus, the pre-fabricated asbestos coil is subjected to the treatment as described hereinafter to render it dense and impervious.

In order to fill the relatively large pores of the asbestos the pre-fabricated coil is dipped in a hydrolyzed solution selected from the organic silicates methyl, ethyl or propyl silicate and then dried. Repeated dippings of the coil in the hydrolyzed solution of the silicate produce a glass-like surface on the coil. In order to drive off the moisture and to ensure the production of the silica ($SiO_2$), the impregnated coil is then subjected to a baking at a temperature of between about 140° C. and about 180° C.

In preparing the hydrolyzed solution of silicate, the particular silicate employed, methyl, ethyl or propyl silicate is suitably mixed with water, denatured alcohol and hydrochloric acid to effect the hydrolysis of the silicate. As a particular example of a hydrolyzed silicate solution employed, 6 parts by volume of ethyl silicate is added to a mixture of one part by volume of water and 4 parts by volume of denatured alcohol after which ⅕ part by volume of a dilute (10%) hydrochloric acid is added to the mixture of the ethyl silicate, water and alcohol. This mixture is stirred until hydrolysis takes place, the rise in temperature accompanying the hydrolysis readily showing that the solution is ready for use. Similar solutions of the methyl or propyl silicates may be prepared and employed for impregnating the asbestos.

After the asbestos is thoroughly impregnated with the silica and baked to drive off all moisture and alcohol, a coating of varnish or other suitable high melting organic compound is applied to the surface of the impregnated asbestos for filling the sub-microscopic pores in the silica deposited in the asbestos. Any varnish which is stable at high temperatures and has a high hardness may be employed for this purpose and may be applied either by dipping the impregnated coils into a bath of the varnish or may be sprayed on or otherwise applied thereto. After the varnish has been applied to the impregnated coil, it is subjected to sufficient heat such as a temperature of between about 150° C. and about 200° C. to cure the varnish coat.

Coils, the asbestos wrappings of which have been impregnated and coated as hereinbefore described and having a thickness of about 32 mils between turns, are found to have a high breakdown strength at room and elevated temperatures. Referring to the following table, it is evident that extremely high breakdown strength in volts is obtained by treating the coils in accordance with this invention.

| Coil No. | Breakdown strength in volts | |
|---|---|---|
| | Room temperature | 250° C. |
| 127 | 2200 | |
| 133 | 2060 | |
| 134 | 2240 | |
| 135 | 2190 | |
| 137 | 2260 | |
| 138 | 2060 | |
| 139 | 2180 | |
| 140 | 2060 | |
| 111 | | 1760 |
| 113 | | 2060 |

As is evident from the above table, the turn-to-turn breakdown strength of the coils prepared has an average of 2150 volts at room temperature with an average of 1910 volts at temperature of 250° C.

As a modification of the deposition of the silica in the asbestos, the impregnation or deposition of the silica may be obtained by dipping the coil having the asbestos wrappings in an unhydrolyzed solution of silicate such as the ethyl, methyl or propyl silicate and then treating the coil with water vapor in the presence of a halogen acid. When dried and baked at about 170° C., the silica produced in this manner is similar to that produced by impregnating the asbestos with the hydrolyzed solution. The coils impregnated in this manner may thereafter be suitably coated with the varnish as described hereinbefore.

The curve of the accompanying drawing illustrates the change of resistance between turns of a coil having an insulation thickness of 32 mils between turns treated in accordance with this invention for different temperatures and illustrates the increase in the electrical properties obtained by this treatment of asbestos insulation.

It is thought that one reason why the method of this invention produces such dense impervious insulating material is because the silica serves to fill the relatively large pores of the insulation and since silica is an excellent absorbent for many organic materials, it is further thought that the varnish or other suitable organic materials applied to the impregnated coils penetrates the silica and is held in the sub-microscopic pores thereof. The silica and the varnish retained in the sub-microscopic pores thereof cooperate in filling the asbestos to give a dense impervious insulating material having a high dielectric strength.

Although this invention has been described with reference to a particular embodiment thereof, it is, of course, not to be limited thereto except insofar as is necessitated by the prior art and the scope of the appended claims.

I claim as my invention:

1. A method of treating asbestos comprising, impregnating asbestos with an unhydrolyzed silicate selected from the group consisting of ethyl, methyl and propyl silicates, subjecting the impregnated asbestos to the action of water vapor in the presence of a halogen acid to effect the hydrolysis of the silicate, subjecting the asbestos containing the hydrolyzed silicate to a temperature of between about 140° C. and about 180° C. to dry it and produce a porous silica in the asbestos, applying a varnish to the impregnated asbestos to fill the pores of the silica, and then subjecting it to sufficient heat to cure the varnish, the varnish, impregnant and asbestos cooperating to give a dense, imprevious insulating material.

2. A method of treating asbestos comprising, impregnating asbestos with a hydrolyzed solution of organic silicate selected from the group consisting of ethyl, methyl and propyl silicates, subjecting the impregnated asbestos to a temperature of between about 140° C. and about 180° C. to dry it and produce a porous silica in the asbestos, applying varnish to the impregnated asbestos to fill the pores of the silica, and then subjecting the asbestos to sufficient heat to cure the varnish, the varnish, impregnant and asbestos cooperating to give a dense, impervious, insulating material.

3. A method of treating asbestos comprising, providing asbestos with a solution of a hydrolyzed silicate selected from the group consisting of ethyl, methyl and propyl silicates, drying the asbestos at a temperature of between about 140° C. and about 180° C. to produce a porous silica in the asbestos, applying a varnish to the asbestos to coat it and fill the pores of the silica, and then subjecting the asbestos to sufficient heat to cure the varnish, the varnish cooperating with the silica in the asbestos to give a dense, impervious insulating material.

EMERSON VENABLE.